US006218014B1

(12) United States Patent
Pickering et al.

(10) Patent No.: US 6,218,014 B1
(45) Date of Patent: Apr. 17, 2001

(54) FLUOROCARBON FUSER MEMBER WITH SILICON CARBIDE FILLER

(75) Inventors: Jerry A. Pickering, Hilton; Jiann-Hsing Chen, Fairport; Tonya D. Binga; Douglas B. Wilkins, both of Rochester; Biao Tan, Rochester, all of NY (US)

(73) Assignee: Nexpress Solutions, Rochester, NY (US)

( * ) Notice: Subject to any disclaimer, the term of this patent is extended or adjusted under 35 U.S.C. 154(b) by 0 days.

(21) Appl. No.: 09/223,505

(22) Filed: Dec. 30, 1998

(51) Int. Cl.[7] .......................... B32B 25/08; B32B 25/14; B32B 25/20

(52) U.S. Cl. .......................... 428/421; 428/328; 428/331; 428/422; 428/447; 428/448; 428/450; 428/451; 399/320; 399/328; 399/330; 399/333; 492/56; 524/430; 524/443; 427/212; 427/409; 427/385.5; 427/387; 427/388.2; 427/407.1; 427/412.4

(58) Field of Search .................................. 428/422, 36.9, 428/421, 447, 446, 448, 450, 451; 399/330, 328, 320, 333; 492/56; 524/430, 443; 427/212, 372.2, 385.5, 387, 388.2, 407.1, 409, 412.4

(56) References Cited

U.S. PATENT DOCUMENTS

| | | | |
|---|---|---|---|
| 4,264,181 | 4/1981 | Lentz et al. . | |
| 4,272,179 | 6/1981 | Seanor . | |
| 4,515,884 | 5/1985 | Field et al. . | |
| 4,562,335 | 12/1985 | Katsuno et al. . | |
| 4,763,158 | 8/1988 | Schlueter, Jr. . | |
| 5,017,432 | 5/1991 | Eddy et al. . | |
| 5,269,740 | 12/1993 | Fitzgerald et al. . | |
| 5,292,562 | 3/1994 | Fitzgerald et al. . | |
| 5,292,606 | 3/1994 | Fitzgerald . | |
| 5,336,596 | 8/1994 | Bronstein et al. . | |
| 5,401,570 | 3/1995 | Heeks et al. . | |
| 5,464,698 | 11/1995 | Chen et al. . | |
| 5,480,724 | 1/1996 | Fitzgerald et al. . | |
| 5,595,823 | 1/1997 | Chen et al. . | |
| 5,763,129 * | 6/1998 | Chen et al. | 430/99 |
| 5,935,712 * | 8/1999 | Tan et al. | 428/421 |
| 5,998,033 * | 12/1999 | Tan et al. | 428/422 |

* cited by examiner

*Primary Examiner*—Vivian Chen

(57) ABSTRACT

A fuser member comprising a support and coated thereon a fluorocarbon elastomer layer containing: (1) a silicon carbide filler and a cupric oxide filler; and/or (2) a silicon carbide filler treated with a silane coupling agent having a reactive functional group, the fuser member further having a functionalized polydimethylsiloxane release agent applied to the fluorocarbon elastomer layer in an amount sufficient to produce, upon incubation at elevated temperature, a surface having improved toner release properties on said outermost layer.

27 Claims, No Drawings

FLUOROCARBON FUSER MEMBER WITH SILICON CARBIDE FILLER

FIELD OF THE INVENTION

This invention relates generally to heat fusing members and methods of making same. More particularly, it relates to an improved fuser roller surface that decreases toner offset and abrasion and increases toner release and thermal conductivity.

BACKGROUND OF THE INVENTION

In electrophotographic fuser systems, fuser roller overcoats are made with layers of polydimethylsiloxane (PDMS) elastomers, fluorocarbon resins, and fluorocarbon elastomers. PDMS elastomers have low surface energy and relatively low mechanical strength, but is adequately flexible and elastic and can produce high quality fused images. After a period of use, however, the self-release property of the roller degrades and offset begins to occur. Application of a PDMS oil during use enhances the release property of the fuser roller surface but shortens roller life due to oil swelling. Fluorocarbon resins like polytetrafluoroethylene (PTFE) have good release property but less flexibility and elasticity than PDMS elastomers. Fluorocarbon elastomers, such as Viton™ and Fluorel™, are tough, flexible, resistant to high temperatures, durable and do not swell, but they have relatively high surface energy and poor thermal conductivity.

Particulate inorganic fillers have been added to fluorocarbon elastomers and silicone elastomers to increase mechanical strength and thermal conductivity. High thermal conductivity is an advantage because heat needs to be efficiently and quickly transmitted to the toner from the outer surface of the fuser roller to fuse the toners and yield the desired toner images. However, incorporation of inorganic fillers to improve thermal conductivity has a major drawback: it increases the surface energy of fuser roller surface and also increases the interaction of the filler with the toner and receiver. After a period of use, the toner release properties of the roller degrade and toner offset begins to occur due to roller wear and weak interaction between the filler and the polymer matrix. It would be desirable to provide a fuser member having a fluorocarbon elastomer overcoat layer containing thermally conductive inorganic fillers, but which still has good toner release property. In addition, the outer surface of the fuser member should be compatible with the functionalized polymeric release agent employed during the fixing process.

Fuser members of fluorocarbon elastomer containing inorganic fillers are disclosed, for example, in U.S. Pat. No. 5,595,823 to Chen et al. Which describes fuser rollers having a surface layer comprising fluorocarbon elastomer and aluminum oxide fillers. These fillers are not treated and are prone to high reactivity with the toner and charge control agents and this, too, is undesirable.

U.S. Pat. No. 5,017,432 to Eddy et al. describes a fluorocarbon elastomer fuser member which contains cupric oxide to interact with the polymeric release agent and provide an interfacial barrier layer. U.S. Pat. No. 5,464,698 to Chen et al. describes fuser rollers having a surface layer comprising fluorocarbon elastomer and tin oxide fillers. The fillers provide active sites for reacting the mercapto-functional polydimethylsiloxane.

Fuser members of condensation-crosslinked PDMS elastomers filled with metal oxides are disclosed, for example, in U.S. Pat. No. 5,401,570 to Heeks et al. This patent describes a silicone rubber fuser member containing aluminum oxide fillers which react with a silicone hydride release oil.

U.S. Pat. No. 5,480,724 to Fitzgerald et al. discloses tin oxide fillers which decrease fatigue and creep (or compression) of the PDMS rubber during continuous high temperature and high stress (i.e. pressure) conditions.

Some metal oxide filled condensation-cured PDMS elastomers are also disclosed in U.S. Pat. No. 5,269,740 (cupric oxide filler), U.S. Pat. No. 5,292,606 (zinc oxide filler), U.S. Pat. No. 5,292,562 (chromium oxide filler), and U.S. Pat. No. 5,336,596 (nickel oxide filler). All provide good results.

Fillers useful in one elastomer material may not be useful in a different elastomer due to chemical or other interactions that may differ substantially between material types. Different metal oxides also may behave differently and be unsuitable for use in a fuser member. U.S. Pat. No. 4,264,181 to Lentz et al. includes lead oxide as a suitable filler in various fluorocarbon elastomers (Viton E430, VitonE60C, Viton GH), yet U.S. Pat. No. 5,017,432 teaches that lead oxide is undesirable on the basis that it produces an unacceptable fuser member in similar fluorocarbon elastomers (Viton GF). U.S. Pat. No. 4,515,884 to Field et al. discloses a fuser member which utilizes metal oxide filled polydimethylsiloxane. The metal oxides are iron and tabular alumina, while calcined alumina is described as being unsuitable for use. U.S. Pat. No. 4,562,335 discloses a silicon carbide filled condensation-cured PDMS elastomer providing good release. U.S. Pat. No. 4,763,158 describes boron nitride as a useful filler in polydimethylsiloxane elastomers; however results described therein indicate that in fluorocarbon elastomers it demonstrates poor release performance and is unsuitable for use.

This application is related to the following commonly owned US applications: U.S. Ser. No. 08/962,129, U.S. Pat. No. 6,114,041, of Tan, Chen, Binga and Wilkins, titled FUSER MEMBER WITH SURFACE TREATED $Al_2O_3$ AND FUNCTIONALIZED RELEASE FLUIDS; U.S. Ser. No. 08/961,838, U.S. Pat. No. 5,998,033, of Tan, Chen, Binga and Wilkins, titled FUSER MEMBER WITH CHEMICALLY MODIFIED ELASTOMER/FILLERS AND FUNCTIONALIZED RELEASE FLUIDS; and U.S. Ser. No. 08/962,108, U.S. Pat. No. 5,935,712, of Tan, Chen, Binga and Wilkins, titled FUSER MEMBER CONTAINING SURFACE TREATED TIN OXIDE.

Unfortunately, as fuser rollers wear, the fillers that are exposed react not only with the functionalized polymeric release agent, but also with the toner, paper substrate and charge control agent. Such reactions build up debris on the surface of the fuser roller, causing deterioration of toner release and great reduction in the life of the fuser roller. Thus, there remains a need for fuser members whose fillers have a low propensity to react with toners or are made to enhance the interaction between the elastomer and filler and also between the polymeric release agent and filler.

SUMMARY OF THE INVENTION

The present invention provides an effective way to solve the problems described above. By filling a fluorocarbon elastomer either with (1) silicon carbide particles in combination with copper oxide; or (2) with silicon carbide particles treated with a coupling agent; or with (3) combinations thereof (that is, with silicon carbide particles treated with a coupling agent in combination with copper oxide), the present invention provides a fuser member with the desired thermal conductivity and toner release properties. The fuser member further may have a functionalized polydimethylsiloxane release agent applied to the fluorocarbon elastomer layer in an amount sufficient to produce, upon incubation at elevated temperature, a surface having improved toner release properties on said outermost layer.

More particularly, the invention provides a fuser member comprising a support and coated thereon a fluorocarbon elastomer layer containing either a silicon carbide filler, wherein the silicon carbide filler has been treated with a silane coupling agent; or the silicon carbide filler is used in combination with cupric oxide; or combinations thereof.

The present invention also provides a method of making a fuser member comprising the steps of a) providing a cylindrical core; b) compounding a fluorocarbon elastomer with a silicon carbide filler wherein the silicon carbide filler has been either treated with a silane coupling agent; or used in combination with cupric oxide; or combinations thereof; c) coating the fluorocarbon elastomer on the cylindrical core; and d) curing the fuser member.

Silicon carbide fillers which have been thus modified can interact with fluorocarbon polymers and bond with them. Such fillers also help to wet the surface and thereby facilitate compounding. The fuser member of the invention greatly improves fuser/toner release, toner offset on the roller surface and decreases abrasion of the fuser member overcoat. The invention provides an effective, durable fuser roller and high quality copies at high speed.

The toner/fuser release can be further improved by applying to the outermost layer of the fuser member an effective amount of a polymethyldisiloxane (PDMS) release agent that includes at least one functional group reactive with the fluorocarbon elastomer, followed by incubation at an elevated temperature. While not wishing to be bound by the proposed theory, it is believed that the functional groups on the coupling agent bring about an interaction between filler and release fluid, thereby forming a protective layer between toner and filler.

An additional advantage is that this invention allows for a high percentage of silicon carbide fillers in the fluorocarbon elastomer and therefore high thermal conductivity can be achieved. In conjunction with high filler loadings, silicon carbide has the added advantage of low density and reduced tendency for the filler to drop out during solvent coating. At the same time, critical fuser properties such as release and wear are notcompromised.

DETAILED DESCRIPTION OF THE INVENTION

The fluorocarbon elastomers used in the invention were prepared according to the method described in commonly owned U.S. Ser. No. 08/805,479 of Chen et al. filed Feb. 25, 1997, U.S. Pat. No. 5,851,673, titled TONER FUSER MEMBER HAVING A METAL OXIDE FILLED FLUOROELASTOMER OUTER LAYER WITH IMPROVED TONER RELEASE as follows.

In the fuser member of the present invention, the outermost layer comprises a cured fluorocarbon elastomer, preferably a terpolymer of vinylidene fluoride (VF), tetrafluoroethylene (TFE), and hexafluoropropylene (HFP), that includes at least about 21 mole percent HFP and, preferably, at least about 50 mole percent VF. Among commercially available fluorocarbon elastomers, Viton™ materials, obtainable from DuPont, are frequently employed for the fabrication of fuser members . These materials include Viton™ A, containing 25 mole percent HFP; Viton™ E45, containing 23 mole percent HFP; and Viton™ GF, containing 34 mole percent HFP.

A preferred fluorocarbon elastomer for the outermost layer of the fuser member of the present invention is Fluorel™ FX-9038, available from 3M, containing 52 mole percent VF, 34 mole percent TFE, and 14 mole percent HFP. More preferred is Fluorel™ FE-5840Q, also available from 3M, containing 53 mole percent VF, 26 mole percent TFE, and 21 mole percent HFP.

Although it is not critical in the practice of this invention, the number-average molecular weight range of the fluorocarbon copolymers may vary from a low of about 10,000 to a high of about 200,000. In the more preferred embodiments, the vinylidene fluoride-based fluorocarbon elastomers have a number-average molecular weight range of about 50,000 to about 100,000.

Suitable fluorocarbon-curing agents or crosslinking agents for use in the process of the invention include the nucleophilic addition curing agents as disclosed, for example, in the patent to Seanor, U.S. Pat. No. 4,272,179, incorporated herein by reference. The nucleophilic addition cure system is well known in the prior art. Exemplary of this cure system is one comprising a bisphenol crosslinking agent and an organophosphonium salt as accelerator. Suitable bisphenols include 2,2-bis(4-hydroxyphenyl) hexafluoropropane, 4,4-isopropylidenediphenol and the like. Although other conventional cure or crosslinking systems may be used to cure the fluorocarbon elastomers useful in the present invention, for example, free radical initiators, such as an organic peroxide, for example, dicumyl peroxide and dichlorobenzoyl peroxide, or 2,5-dimethyl-2,5-di-t-butylperoxyhexane with triallyl cyanurate, the nucleophilic addition system is preferred.

Suitable accelerators for the bisphenol curing method include organophosphonium salts, e.g., halides such as benzyl triphenylphosphonium chloride, as disclosed in U.S. Pat. No. 4,272,179 cited above.

Nucleophilic addition-cure systems used in conjunction with fluorocarbon copolymers can generate hydrogen fluoride and thus acid acceptors are added as fillers. Suitable acid acceptors include metal oxides or hydroxides such as magnesium oxide, calcium hydroxide, zinc oxide and the like, which can be used as mixtures in various proportions, typically in the range of 5 to 40 parts per 100 parts of fluorocarbon polymer.

The outermost layer also incorporates a silicon carbide particulate filler. The silicon carbide has a concentration of from 10 to 50 percent of the total volume of the layer. The silicon carbide filler may range from 0.5 microns to 80 microns average particle size, preferably 1 to 20 microns. The layer may also include copper oxide. In a preferred embodiment, 10 to 50 parts of cupric oxide are included in the outermost layer. The filler has a total concentration of 15 to 55 percent of the total volume of the layer.

In the most preferred embodiment of the present invention, the silicon carbide filler has been surface treated with a silane coupling agent. The preferred silane coupling has the general structure:

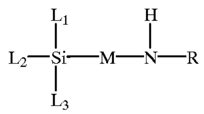
or
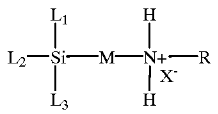

wherein

M=aliphatic or aromatic chain with C atom numbers varying from 0–20.

R=proton, phenyl or alkyl, etc.

$L_1$, $L_2$, $L_3$=Alkoxy, alkyl, halide, etc. with C atom numbers varying from 0–10 and at least one of the L should be alkoxy or halide.

X=negative counter ion, e.g. chloride ion, bromide ion, etc.

Suitable coupling agents are 3-aminopropyltrimethoxysilane, 3-aminopropyltriethoxysilane, N-phenylaminopropyltrimethoxysilane, (aminoethylaminomethyl) phenethyltrimethoxysilane, aminophenyltrimethoxysilane, 3-aminopropyldimethoxysilane, 3-aminopropylmethyldiethoxysilane, 3-(2-aminoethylamino)propyltrimethoxysilane, 3-(2-N-benzylaminoethylaminopropyl)trimethoxysilane hydrochloride, etc. While not wishing to be bound by theory, it is thought that surface silicon hydroxide groups on the silicon carbide particles are active and may interact with toner causing offset. These active silicon hydroxide groups are also allow surface treatment with the silane coupling agent described herein, and this prevents toner interaction by capping the active groups and reacting with the fluorocarbon elastomer. This reaction also enhances the bonding of the filler particles reducing wear. Treatment of the fillers also reduces the interaction of charge agents in the toner with the filler which results in charge agent staining and possible degradation of the fluorocarbon elastomer. It is likely that other silicon containing fillers may be treated similarly by those skilled in the art. Such fillers may include tungensten silicide, molybdnum disilicide, silicon nitride, titanium silicide etc.

The filler may be treated with the silane coupling agent by reacting the filler with a dilute solution of the silane coupling agent. The solvent may be any that does not interfere with the reaction of the coupling agent to the filler. Alcohol with a few percent of water added is a typical solvent system. The filler can also be treated by the silane coupling agent by combining the silicon carbide filler directly with the silane coupling agent without solvent present. In another embodiment the silane coupling agent may be added during the compounding of the fluorocarbon elastomer and the silicon carbide filler. In this way the filler treatment and the filler compounding with the fluorocarbon elastomer are accomplished in a single step.

A fuser roll made using the present invention typically includes a cylindrical core and a coating of the invention described herein on the cylindrical core. An elastomeric base cushion can be applied to the core prior to the application of the coating of the present invention. Base cushions are typically silicone materials which may be of low thermal conductivity or high thermal conductivity. High thermal conductivity base cushions are typically used where heat is applied from within the fuser member core. In some applications it may be further required that an adhesion layer be applied between the base cushion and the coating to improve the strength of the interface.

Although the fuser member of the invention, wherein the silicon carbide particles have been treated with a coupling agent, exhibits generally good toner offset and release characteristics, these properties may be improved by applying a polydimethylsiloxane (PDMS) release agent to the outermost layer and incubating the fuser member to form a surface that displays enhanced toner release. Preferred PDMS release agents, which include a functional group that is reactive with the fluorocarbon elastomer, have the formula

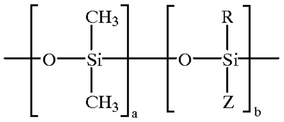

where R is alkyl or aryl containing up to about 8 carbon atoms, Z is selected from the group consisting of hydrogen, aminoalkyl containing up to about 8 carbon atoms, and mercaptoalkyl containing up to about 8 carbon atoms, and the ratio of a:b is about 1:1 to 3000:1. In more preferred embodiments, Z is hydrogen, aminopropyl, or mercaptopropyl. In a particularly preferred embodiment, Z is hydrogen and the a:b ratio is about 10:1 to 200:1. In another particularly preferred embodiment, Z is aminopropyl and the a:b ratio is about 200:1 to 2,000:1.

An example of a hydrogen-functionalized PDMS release agent is EK/PS-124.5 (available from United Chemical), which contains 7.5 mole percent of the functionalized component and has a viscosity of 225 centistokes. Xerox amino-functionalized PDMS 8R3995 Fuser Agent II contains 0.055 mole percent of an aminopropyl-substituted component and has a viscosity of 300 centistokes. Xerox mercapto-functionalized PDMS 8R2955 contains 0.26 mole percent of a mercaptopropyl-substituted component and has a viscosity of 275 centistokes. A non-functionalized PDMS release oil, DC-200 (from Dow Corning), is useful for purposes of comparison with the functionalized agents and has a viscosity of 350 centistokes. Such functional and non-functional release agents may also be applied continuously during use of the fuser roll described in the present invention.

Materials

Fluorel™ FE Fluoroelastomer 5840Q, ter-polymer of vinylidene fluoride, hexafluoropropylene and tetrafluoroethylene (FE5840Q)—3M, Co.

MgO (Maglite™ D)—Merck/Calgon Corp.

$Ca(OH)_2$—Aldrich®

SiC(800)—SikaIII™, 800 grit, Washington Mills

SiC(1000)—SikaIII™, 1000 grit, Washington Mills

CuO—J. T. Baker®

3-Aminopropyltriethoxylsilane (NCR)—PCR®

The invention is further illustrated by the following examples and comparative examples.

EXAMPLE 1 (E-1)

Treatment of Filler Surface with Coupling Reagent Solution

Treatment solution was freshly prepared by adding aminopropyltriethoxylsilane (2 wt. %) to $EtOH/H_2O$ (95/5 by vol.) solvent and stirred for 10 minutes. Fillers (SiC [SikaIII™, 1000 grit] or CuO or mixtures thereof) were covered by solution and stirred in ultrasonic bath for 10 minutes. Fillers were then washed twice with EtOH and dried under reduced pressure (under vacuum) at 150° C. for 30 minutes and at room temperature overnight.

EXAMPLE 2 (E-2)

Treatment of Filler Surface with Coupling Reagent without Solvent

The treatment was accomplished by adding adding aminopropyltriethoxylsilane (0.1 wt. %) to fillers (SiC [SikaIII™, 1000 grit] or CuO and mixtures thereof) in a V-blender for dry mixing. The mixture was rotated overnight (20 hours) before removal and use.

EXAMPLE 3 (E-3)

Compounding

Fluorel™ FE5840Q (500 gm), MgO (15 gm), Ca(OH)2 (30 gm) and SiC (SikaIII™, 1000 grit) (360 gm), and CuO (250 gm) were thoroughly compounded in a two roll mill with water cooling at 63° F. (17° C.) until a uniform, dry composite sheet was obtained.

Preparation of a Compression Mold Slab

The fluorocarbon elastomer—treated fillers gum obtained as described above was compression molded into 75-mil plaques, with curing for 20 minutes at 350° F. (177° C.) under 45 tons pressure and post-curing for 48 hours at 450° F. (232° C.). The plaques were employed in tests to evaluate the toner offset and release characteristics, wear and thermal conductivity as described below and results are indicated in Table 1.

EXAMPLE 4 (E-4)

Substantially the same as in Example 3, except that the SiC is surface treated using method described in Example 2 and there in no CuO present.

Comparative Example 1 (CE-1)

Substantially the same procedure as in Example 3, except that the SiC is replaced by boron nitride at 25 vol % (213 parts) and the results are indicated in Table 2.

Comparative Example 2 (CE-2)

Substantially the same procedure as in Example 3, except that the SiC is replaced by 25 vol % SnO2 (138 parts) and the results are indicated in Table 2.

Comparative Example 3 (CE-3)

Substantially the same procedure as in Example 3, except that there is no CuO and the results are indicated in Table 2.

Test Methods for Results in Table 1

The test described immediately below was conducted using the powders of Example 1 and 2 above. Results appear in Table 2.

X-Ray Photoelectron Spectroscopy (XPS)

The XPS measurements were performed on a Physical Electronics Φ5600 ESCA system. The peak fitting assignments were based on the *Handbook of X-ray Photoelectron Spectroscopy*, published by Perkin-Elmer Corporation.

TABLE 1

Atomic % of Surface Element for SiC

| Surface Group | Prior to Treatment (SikaIII ™) | E-1 Solution Treated | E-2 Dry Treatment |
|---|---|---|---|
| Si-OH | 1.96 | 4.64 | 4.48 |
| N (NH4+ or Ammonia salt) | 0 | 1.7 | 0.75 |
| SiOx * | 0 | 2.02 | 2.28 |

* Distinct from SiC and SiOH silicon species.

The results demonstrate that both the solution and dry treatment methods incorporate the 3-Aminopropyltriethoxysilane onto the silicon carbide surface.

Test Methods for Results in Table 2

The three tests described immediately below were conducted using the plaques of Examples 3, and Comparative Examples 1–2 above. Results appear in Table 2.

Toner Offset and Release Measurement

These procedures are described in U.S. Ser. No. 08/805,479 of Chen et al. filed Feb. 25, 1997, titled TONER FUSER MEMBER HAVING A METAL OXIDE FILLED FLUOROELASTOMER OUTER LAYER WITH IMPROVED TONER RELEASE as follows.

The test plaques obtained as described above are employed to evaluate the toner offset and release force characteristics of the outermost layer of the fuser members. A plaque is cut into 1-inch (2.56-cm) squares. To the surface of each of four squares is applied in unmeasured amount, one of the previously mentioned PDMS release oils: non-functionalized release oil DC-200 (PDMS); hydrogen-functionalized oil EK/PA-124.5 (PDMS-H); Xerox amino-functionalized PDMS 8R79 (PDMS-$NH_2$); and Xerox mercapto-functionalized PDMS 8R2955 (PDMS-SH).

Each sample was incubated overnight at a temperature of 175° C. Following this treatment, the surface of each sample was wiped with dichloromethane. Each sample was then soaked in dichloromethane for one hour and allowed to dry before off-line testing for toner offset and release properties.

Each sample, including those untreated with release agent, was tested in the following manner:

A 1-inch (2.56-cm) square of paper covered with unfused styrenebutyl acrylate toner was placed in contact with a sample on a bed heated to 175° C., and a pressure roller set for 80 psi was locked in place over the laminate to form a nip. After 20 minutes the roller was released from the laminate.

The extent of offset for each sample was determined by microscopic examination of the sample surface following delamination. The following numerical evaluation, corresponding to the amount of toner remaining on the surface, was employed.

1 0% offset
2 1–20% offset
3 21–50% offset
4 51–90% offset
5 91–100% offset

Qualitative assessment of the force required for delamination of the paper from the sample is a follows:

1 low release force
2 moderate release force
3 high release force

Thermal Conductivity Measurement

A round piece of plaque 5 cm diameter was cut for the test. Thermal conductivity was measured by Holometrix™ TCA-100 Thermal Conductivity Analyzer. Reported values (BTU/hr-ft-° F.) were from two stacks of samples.

TABLE 2

| Sample ID | CE-1 | CE-2 | E-3 |
|---|---|---|---|
| Fillers | BN, 25 vol % CuO, 50 pt | SnO2, 138 pt CuO, 50 pt | SiC, 25 vol % CuO, 50 pt |
| Offset/Release: | | | |
| PDMS-$NH_2$ | 2/3 | 1/1 | 1/1 |
| PDMS-H | 2/3 | 2/2 | 1/2 |
| PDMS-SH | 3/3 | 2/2 | 1/2 |
| PDMS | 3/3 | 2/2 | 4/3 |
| Charge Agent Stain | Stain | — | Slight |
| Thermal Conductivity | .26 | 0.26 | 0.3 |

The results demonstrate the silicon carbide filler in combination with copper oxide shows good release results with the functional oils and good thermal conductivity.

Test Methods for Results in Table 3

The test described immediately below was conducted using the plaques of Examples 4 and Comparative example 3 above. Results appear in Table 3.

Wear Measurement

A piece of sample plaque 9/16"×2" was cut for the wear test. A Norman abrader (by Norman Tool, Inc.) was used, and the temperature was set at 350° F. The speed was set at ~30 cycles/minute and the load was set at 984 grams. Four rolls of paper were run on the plaque sample for 480 cycles each and the wear tracks were measured for depth by a surfanalyzer 4000. The average of the four tracks was reported in mils.

Charge Agent Stain

A piece of sample plaque 1"×1" is cut and pure charge agent placed on the top of the sample. The sample is placed in a convection oven at 175 C. for 24 hours. After oven treatment the excess charge agent is removed and the treated side evaluated for evidence of stain and adsorption by the charge agent.

TABLE 3

| Sample ID | CE-3 | E-4 |
|---|---|---|
| Fillers | SiC, 25 vol % | SiC, 25 vol % (treated, 0.1% NCR) |
| Offset/Release: | | |
| PDMS-$NH_2$ | 1/1, 1/2 | 1/1 |
| PDMS-H | 3/3, 1/3 | 1/2 |
| PDMS-SH | 3/2, 2/3 | 1/1 |
| PDMS | 4/3, 2/3 | 2/2 |
| Wear | 1.2, 0.7 | 0.4 |
| Charge Agent Stain | Slight | None |

NCR—3-Aminopropyltriethoxysilane

The results show that release is improved and wear is significantly better for the sample with treated filler than for the sample with untreated filler. The treated SiC filler incorporated fuser member also shows resistance to stain from the charge agent in the off-line test.

EXAMPLE 5 (E-5)

Describes a coated roller comprising the following: an aluminum core; a base cushion consisting of 198 mils of addition cure silicone (Silastic-J); and a top coating consisting of Fluorel™ FE5840Q (700 gm), MgO (21 gm), Ca(OH)2 (42 gm), SiC (SikaIII, 800 grit) (732 gm), and CuO (350 gm) (where the SiC and CuO are treated with NCR as described in example 1) and compounded as described in Example 3, dissolved in MEK:MeOH mixture (85:15) (45 wt %) and ring coated to a thickness of two mils. The roll was cured at 260 C. for 24 hours after a 24 hour ramp from room temperature. After curing the roller was pretreated by hand applying an excess of dilute amine functional silicone oil (1:7 ratio of functional oil to non-functional oil) of 300 centistoke viscosity, and placing in an oven at 175° C. for 18 hours. The roll was placed in a full process electrophotographic copier for fuser roll testing measuring the fusing quality, roller contamination, and run performance. The roll was run for approximately 25,000 copies at 120 copies per minute without a failure. The roll contamination was low and decreased throughout the run. The roller demonstrated remarkable temperature stability and excellent fusing quality during the run. After testing the coating was removed and the thermal conductivity measure using the apparatus described previously. The silicon carbide filled coating was found to have excellent thermal conductivity of 0.47 BTU/hr*ft*F. Elemental analysis indicated that over 95% of the silicon carbide filler from the compound was present in the layer demonstrating the low tendency for filler settling during coating.

The invention has been described in detail with particular reference to certain preferred embodiments thereof, but it will be understood that variations and modifications can be effected within the spirit and scope of the invention.

What is claimed is:

1. A fuser member comprising a support and coated thereon a fluorocarbon elastomer layer containing a silicon carbide filler and a cupric oxide filler, the fuser member further having a functionalized polydimethylsiloxane release agent applied to the fluorocarbon elastomer layer in an amount sufficient to produce, upon incubation, a surface having toner release properties on said outermost layer.

2. A fuser member comprising a support and coated thereon a fluorocarbon elastomer layer containing a silicon carbide filler, said filler having been treated with a silane coupling agent having a reactive functional group.

3. A fuser member of claim 1 or 2 further comprising a base cushion layer between the support and the fluorocarbon elastomer layer.

4. The fuser member of claim 3 wherein the base cushion layer comprises silicone rubber.

5. The fuser member of claim 3 wherein the base cushion layer contains a thermally conductive filler.

6. The fuser member of claim 3 further comprising an adhesion layer between the base cushion layer and the fluorocarbon elastomer layer.

7. The fuser member of claim 1 or 2 wherein the fluorocarbon elastomer comprises:

$—(CH_2CF_2)_x$;

$—(CF_2CF_2)_y$; and

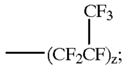

where x is from 30 to 90 mole percent, y is from 10 to 70 mole percent, and z is from 0 to 40 mole percent.

8. The fuser member of claim 7, wherein: x is 40 to 60 mole percent, y is 20 to 40 mole percent, and z is 10 to 30 mole percent.

9. The fuser member of claim 1 or 2 wherein the silicon carbide is 20 to 140 parts by weight per 100 parts by weight of the fluorocarbon elastomer.

10. A fuser member of claim 2 further containing a cupric oxide filler.

11. The fuser member of claim 1 or 10 wherein the cupric oxide is 10 to 50 parts by weight per 100 parts by weight of the fluorocarbon elastomer.

12. The fuser member of claim 2 wherein the silane coupling agent has the structure:

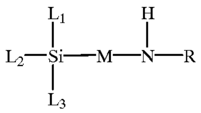

or

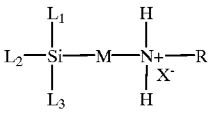

wherein

M represents aliphatic or aromatic chain with carbon atom numbers varying from 0–20;

R represents proton, phenyl or alkyl with carbon atom numbers varying from 0–8;

$L_1$, $L_2$, and $L_3$ each independently represent alkoxy, alkyl, or halide with carbon atom numbers varying from 0–10 and at least one of the L should be alkoxy or halide; and X− represents negative counter ion.

13. The fuser member of claim 12 wherein the silane coupling agent is selected from the group consisting of aminopropyl triethoxysilane, aminopropyl trimethoxysilane, aminopropyl dimethoxyethoxysilane, and N-(2-aminoethyl-3-aminopropyl trimethoxysilane.

14. The fuser member of claim 2, further having a polydimethylsiloxane release agent applied to the fluorocarbon elastomer layer in an amount sufficient to produce, upon incubation, a surface having toner release properties on said outermost layer.

15. The fuser member of claim 1 or 14 wherein the polydimethylsiloxane release agent comprises an aminoalkyl functional group reactive with the fluorocarbon elastomer.

16. The fuser member of claim 1 or 14 wherein the polydimethylsiloxane release agent comprises a functional group interactive with the silane coupling agent.

17. The toner fuser member of claim 1 or 14 wherein the polydimethylsiloxane release agent has the formula

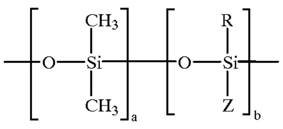

wherein R is alkyl or aryl containing up to 8 carbon atoms, Z is selected from the group consisting of hydrogen, aminoalkyl containing up to 8 carbon atoms, and mercaptoalkyl containing up to 8 carbon atoms, and the ratio of a:b is about 1:1 to 3000:1.

18. The fuser member of claim 17 wherein Z is hydrogen, aminopropyl, or mercaptopropyl.

19. The fuser member of claim 17 wherein Z is hydrogen and the a:b ratio is about 10:1 to 200:1.

20. The fuser member of claim 17 wherein Z is aminopropyl and the a:b ratio is about 200:1 to 2,000:1.

21. The fuser member of claim 17 wherein the polydimethylsiloxane release agent is further applied during operation of the fuser member.

22. A method of making a fuser member comprising the steps of a) providing a cylindrical core;

b) compounding a fluorocarbon elastomer with a silicon carbide filler, the filler having been treated with a silane coupling agent;

c) coating the fluorocarbon elastomer on the cylindrical core; and d) curing the fuser member.

23. The method of claim 22 wherein a base cushion layer is deposited on the core prior to step c).

24. The method of claim 23, further comprising the step of coating an adhesion layer on the base cushion layer prior to step c).

25. A method of making a fuser member comprising the steps of:

a) providing a cylindrical core;

b) compounding simultaneously a fluorocarbon elastomer with a silicon carbide filler and a silane coupling agent, the filler being previously untreated with a silane coupling agent whereby the silane coupling agent treats the silicon carbide filler;

c) coating the fluorocarbon elastomer on the cylindrical core; and d) curing the fuser member.

26. The method of claim 25 wherein a base cushion layer is deposited on the core prior to step c).

27. The method of claim 26, further comprising the step of coating an adhesion layer on the base cushion layer prior to step c).

* * * * *